United States Patent [19]
Heard et al.

[11] 3,838,420
[45] Sept. 24, 1974

[54] COORDINATE STORE DIGITAL SCAN CONVERTER

[75] Inventors: James L. Heard; William C. Hoffman, both of Torrance; Eugene W. Opittek, Tustin; Gerald Wolfson, Los Angeles, all of Calif.

[73] Assignee: Hughes Aircraft Company, Culver City, Calif.

[22] Filed: Aug. 29, 1972

[21] Appl. No.: 285,285

[52] U.S. Cl.. 343/5 SC, 178/DIG. 3, 340/146.1 BA
[51] Int. Cl. ............................................. G01s 7/04
[58] Field of Search ......... 343/5 SC; 340/146.1 BA; 178/DIG. 3; 235/181

[56] References Cited
UNITED STATES PATENTS

| | | | |
|---|---|---|---|
| 3,412,398 | 11/1968 | Schrader | 343/5 SC |
| 3,603,725 | 9/1971 | Cutler | 178/DIG. 3 |
| 3,609,244 | 9/1971 | Mounts | 178/DIG. 3 |
| 3,631,483 | 12/1971 | Ruggles | 343/5 SC |
| 3,670,096 | 6/1972 | Candy et al. | 178/DIG. 3 |

Primary Examiner—Maynard R. Wilbur
Assistant Examiner—G. E. Montone
Attorney, Agent, or Firm—W. H. MacAllister; Walter J. Adam

[57] ABSTRACT

A radar processor encodes the data associated with target hits. This digital data is entered into a small circulating memory together with an age code. The age code is decremented at a predetermined rate. The digital data while being transferred between the output and the input of the memory is also applied to a suitable display system. The age code determines the brightness of the display.

When the age code has decreased below a predetermined level, this is sensed and new target hit data is entered into the location occupied by the target hit data associated with the minimum age code.

To minimize the size of the memory required, new target hit data either from the same radar processor or another source, if desired, is compared with all of the target hit data in the memory, and if correlation is established, then the new target hit data is not entered into memory, but the old target hit data has its age updated and a record of correlation is made.

7 Claims, 4 Drawing Figures

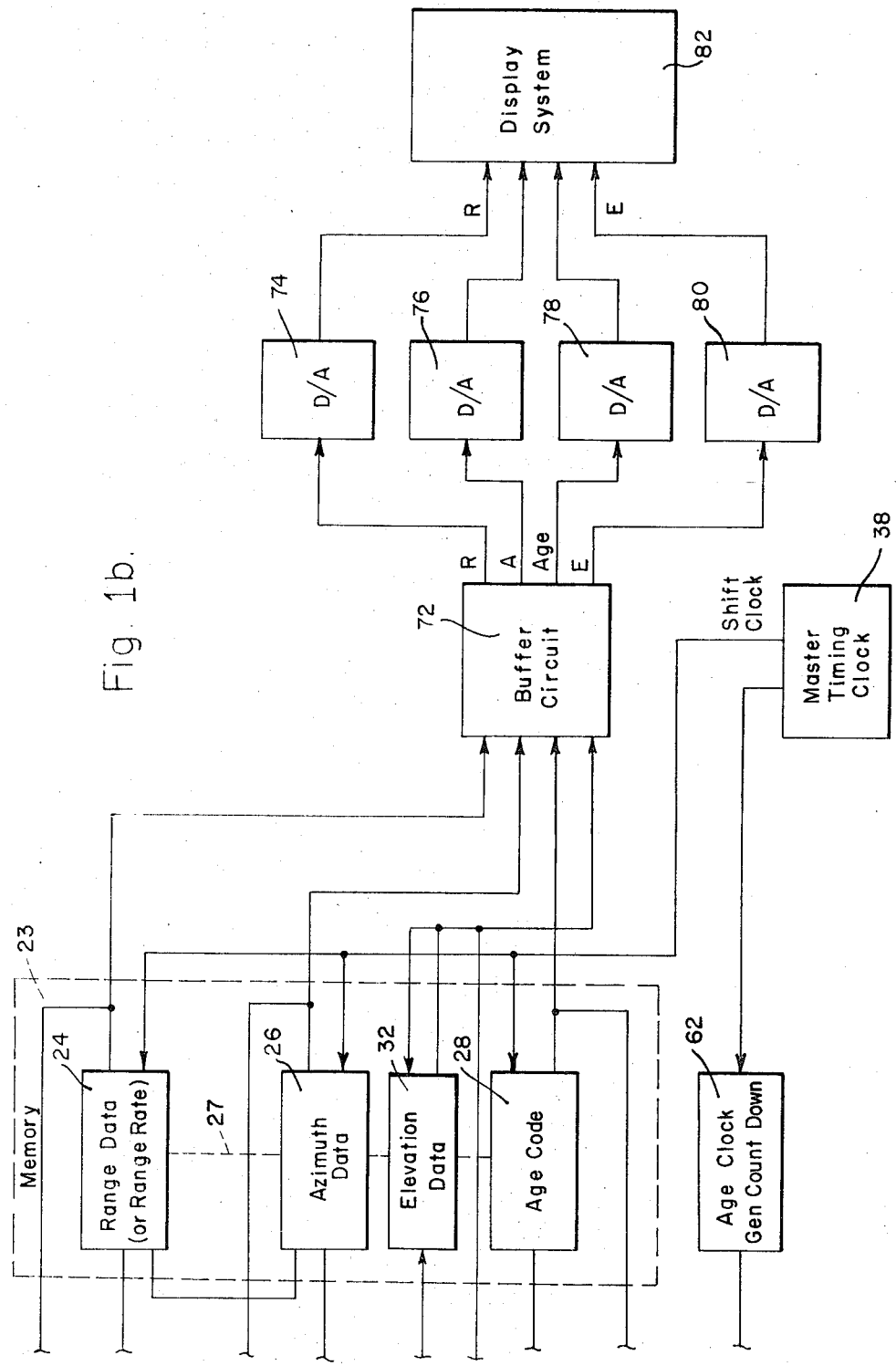

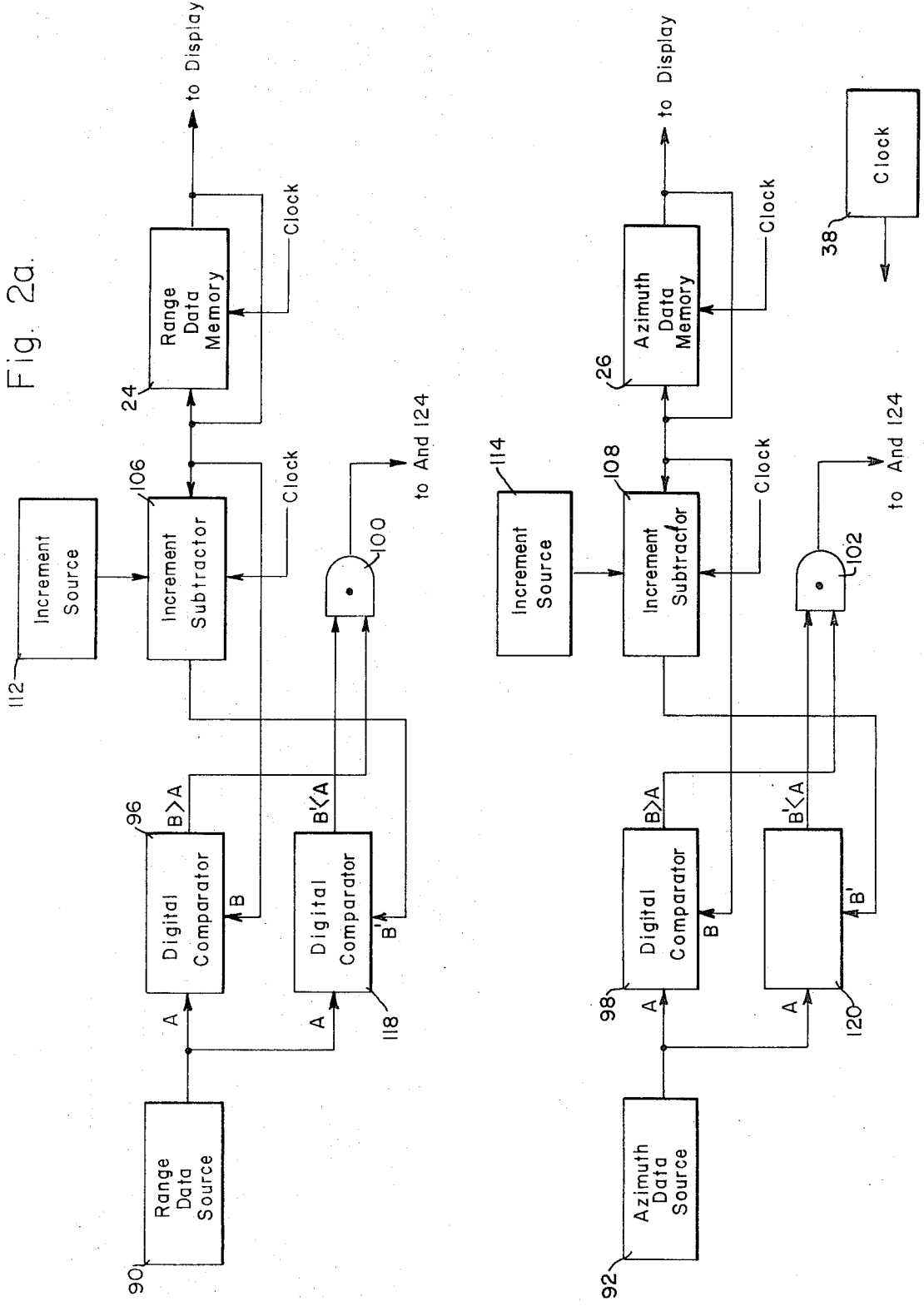

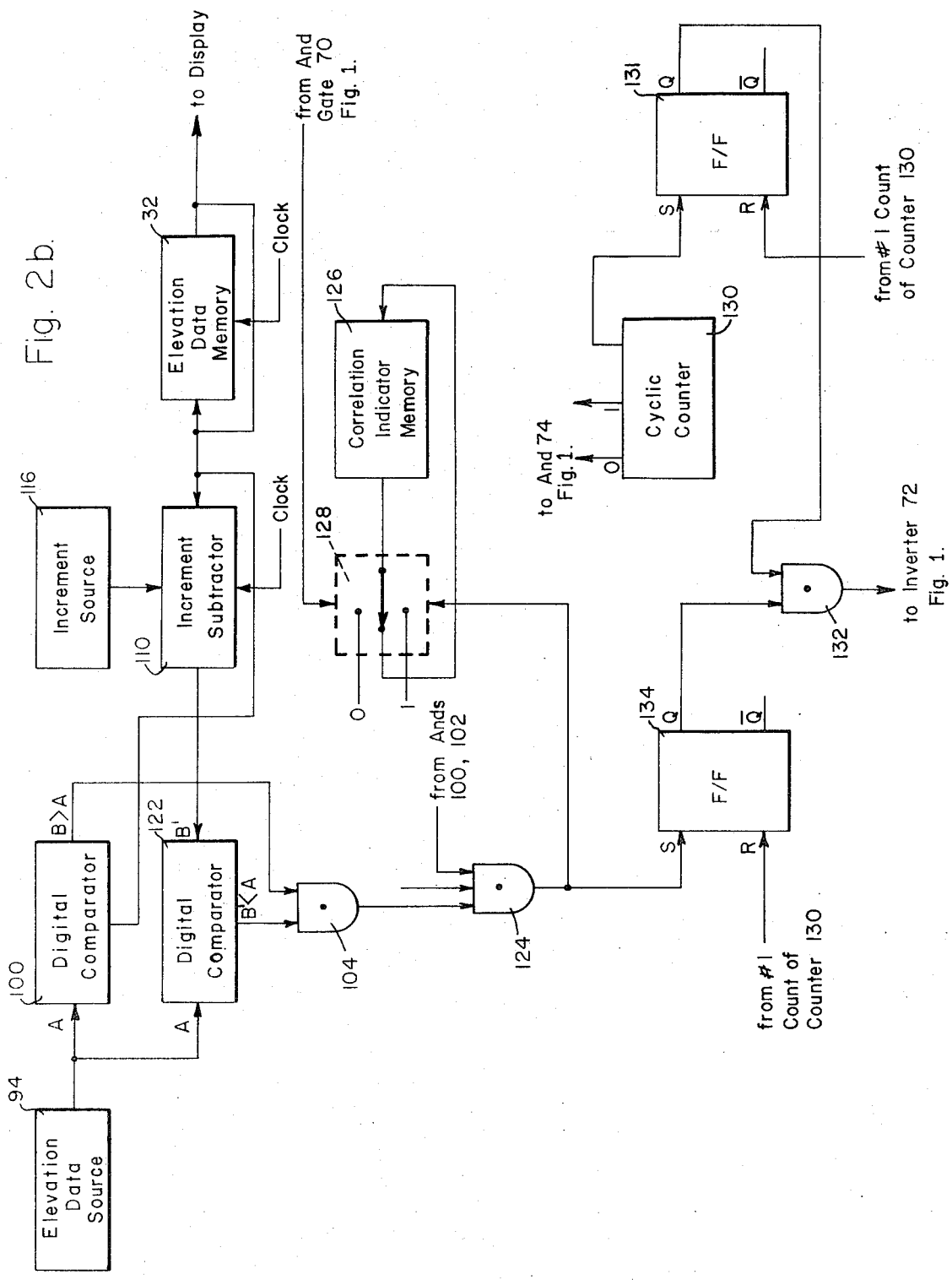

COORDINATE STORE DIGITAL SCAN CONVERTER

The invention herein described was made in the course of or under a contract or subcontract thereunder with the Air Force.

BACKGROUND OF THE INVENTION

This invention relates to systems for displaying radar information, and more particularly, to improvements therein.

Radar display systems which include a memory for storing target hit data in digital form with an age code have been devised. However, the size required for the memory used in the previously known system has been quite large since it had to have a capacity sufficiently large to store the digital data for as many target hits as could be obtained with the particular radar system. If the capacity of the memory were made less, then one would miss the target hits occuring when the capacity of the memory overflowed, which of course, could not be tolerated.

OBJECTS AND SUMMARY OF THE INVENTION

An object of this invention is to provide a data scan converter having a memory of a size which is considerably reduced over that thought necessary heretofore.

Another object of this invention is the provision of a data scan converter which stores only new target hit data and not all target hit data.

Yet another object of the present invention is the provision of a new, simplified and less expensive scan conversion system.

These and other objects of the invention are achieved in a system wherein provision is made to compare either the exact target hit data stored in memory or target hit data stored in memory which is within a predetermined region with incoming target hit data. If the two pieces of information are correlated, then, a flag or special symbol is stored in memory to be associated with that target hit data, and the new target hit data is not entered into the memory. If no correlation is established, then the new target hit data is entered into memory at the next available storage spot. Each item of target hit data has associated therewith an age code which is decremented periodically, such as for each cycle of the target hit data through the memory. When the age code indicates that the age has reached a predetermined level, new target hit data is written over the old target hit data. Provision is made to display the circulating target hit data on any suitable type of CRT display.

The novel features of the invention are set forth with particularity in the appended claims. The invention will best be understood from the following description when read in conjunction with the accompanying drawings.

BRIEF DESCRIPTION OF THE DRAWINGS

FIGS. 1A, 1B, 2A and 2B are block schematic diagrams of an embodiment of the invention.

DESCRIPTION OF THE PREFERRED EMBODIMENTS

Figure 1A:
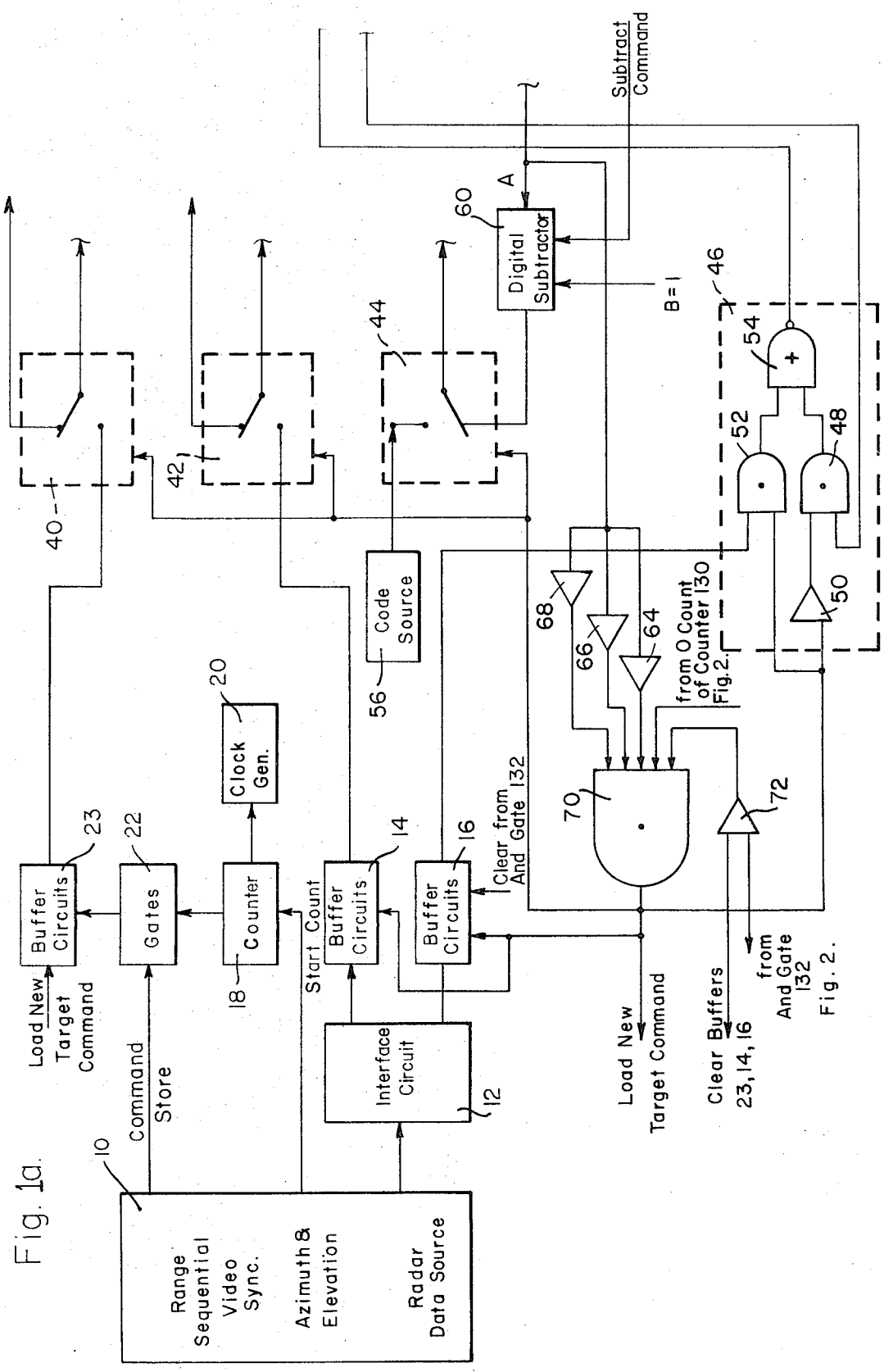

An aircraft radar data source 10, in the course of its scanning operation generates azimuth and elevation data in digital form. It also generates sync pulses at the start of each sweep and provides a signal designated as range sequential video, or range rate video when a target hit is made. The azimuth and elevation digital data, usually are serial in form and are applied to interface circuits 12, for the purpose of being separated into the respective digital azimuth and digital elevation data. The interface circuits may simply be a serial register which, when filled with the proper number of digits, dumps its output in parallel into an azimuth buffer circuit, or an elevation buffer circuit, respectively 14, 16 dependent upon which digital word is in the register. The buffer circuits hold the incoming azimuth and elevation data until they can be loaded into the main memory. The range information is digitized by a range counter 18, which is enabled to count pulses from a clock generator 20, when it receives a sync pulse, at the commencement of the radar sweep. When the radar data source produces a video signal indicative of the target hit, gates 22 are enabled to enter and store the count of the counter at that time, into buffer circuits 23, whereby the range at which the target hit occurs is digitized. If required, range rate data may be handled in this manner also.

The main memory 23 can consist of any memory store arrangement, which is suitable for cycling. Shift registers are preferred, although serially addressed random access memories, or magnetic drums or discs may also be used. By way of example, an embodiment of the invention which was built had provisions for storage and loading control for up to 128 targets of 39 bits each, the 128 main memory target locations were processed at a clock rate of 125 KHz thus requiring 1,024 microseconds for a complete updating cycle.

The main memory store 23 may consist of range data store (or range rate store) portion 24, which may be for example, on the order of 8 bits wide by 128 bits long. An azimuth data memory portion 26, may be 8 bits wide by 128 bits long, receives and stores the azimuth digital data. An age clock memory data portion 28 stores age data for each target and may be 3 bits wide by 128 bits long. An elevation data memory store portion 12, may be 7 bits wide by 128 bits long. Dotted lines 27 indicate that each word position may include range azimuth elevation and age code data, all the data for one target being at the same register position and being cycled or shifted to the output at the same time.

Shift pulses for all of the memory shift registers are derived from a master timing clock circuit 38. Each one of the shift registers, which comprise the main memory, circulates at a rate determined by the frequency of the master timing clock.

An arrangement is provided at the input of each one of the respective main target shift registers respectively 24, through 32, to either re-enter or circulate the data received from the outputs of the shift registers or to enter new target data. These arrangements, respectively 40, 42, 44, and 46, are analogized as mechanical single pole, double-throw switches which, in the switching position shown, circulate the data in the shift registers and in the other position enter new target data. A specific electronics circuit equivalent (enclosed in the rectangle 46), comprises an AND gate 48, (actually seven AND gates since the 7 bits of elevation data appear simultaneously at the output of the shift register 32), which receives the output of the shift register memory portion 32. The other input to the AND gate 48 is the output of an inverter 50, whose input comprises a "load new target command." A second AND gate 52, (also representative of 7 parallel AND gates), receives, as one input, the output of the buffer circuit 16, which comprises the new elevation data and as the other input a "load new target command." Both AND gates 48 and 52 are connected to an OR gate 54 (also representative of 7 OR gates), whose output is connected to the inputs of the elevation data portion of the main memory.

In operation, AND gate 48 is enabled so that the elevation data can circulate through the memory until such time as a "load new target" command occurs. At this time, AND gate 48 is disenabled, and AND gate 52 is enabled. As a result, the new target data can be entered into the elevation data shift register. The "load new target" command terminates after one clock pulse and AND gate 48 is enabled again.

At the time that new target data is entered into the main memory, in response to a "load new target" command, an age code is also entered into the memory. The age code constitutes, by way of example, a 3 bit code. This 3 bit code is derived from a "111" code source 56. This code source may be any suitable source of binary one potentials, which are strobed so that the 111 bits are entered into the age code portion 28 of the main memory.

The age code portion of the memory does not circulate directly from its output to its input as do the other memory portions. The age code portion of the memory circulates from the output to the input through a digital subtract circuit 60. One input to this digital subtractor is the output of the age clock shift register 28, the other input is derived from a signal source representative of the digital 1 (B = 1), which is subtracted from the age code entered into the digital subtractor at the time. The digital subtractor 60 is enabled in response to a subtract command from an age clock generator 62. This is a count down counter which receives pulses from the master timing clock 38 and divides these down to provide the necessary subtract command to enable the digital subtractor each time an age code is shifted out of the age code register 28. The age clock generator 62 may be made manually adjustable so that it issues fewer "subtract commands," whereby the aging process is slowed down (or terminated) if desired.

The output of the digital subtractor is applied to the input switching arrangement to be entered back into the age code store 28. When the age code for a particular target reaches a predetermined minimum value which can be 000, if desired, this is sensed and used to enable a new target to be loaded, when other portions of the circuit make this possible. By way of example, the 3 bit outputs from the age clock shift register 28 are applied through three inverters respectively 64, 66, and 68, to an AND gate 70. The other required inputs to the AND gate 70 is the output of an inverter 72, whose input is a correlation signal, which will be explained in connection with FIG. 2. Another required enabling input is the zero count output of a counter 130, also shown in FIG. 2. The "load new target command" output of the AND gate 70 is applied to the buffer circuits to transfer out the data, to the input switching arrangements 40, 42, 44, and 46, to enable the range, azimuth and elevation data to be entered into the respective memory portions 24, 26, and 32, and also to enable a 111 code to be entered into the age clock memory portion 28. The buffer circuits can then assure new target hit data.

The outputs from the memory, are applied to a buffer circuit 72 at a desired recirculation rate. The range, azimuth, age code and elevation outputs from the buffer circuit are applied to the respective digital-to-analog converters 74, 76, 78 and 80. The age code serves as the "Z" or intensity signal for a display. The outputs of the respective digital-to-analog circuits, 74 through 80, are applied to a display system 82. The display utilizes these signals for the type of display desired. For example, a B-type of display may use the range and azimuth signals. A C-type of display may use the elevation and azimuth signals, etc.

In order to enable an orientation of the circuitry shown in FIG. 2 with that shown in FIG. 1, portions of the circulating memory, respectively, 24, 26, 28 and 32, are shown again in FIG. 2. It is desired to correlate the digital data in the memory portion with the digital data either provided by the same radar system, which has provided the digital data which is already in memory, or by another source for range, azimuth and elevation data, such as an IFF or a hand control system. These sources of target digital data are identified as the range data source 90, azimuth data source 92, and elevation data source 94. It should be understood that it is possible to compare the target hit data in memory with multiple target hit data sources using well known multiples, techniques, and while a single new target hit data source is shown here, it should not be considered as a limitation upon the invention. The outputs from these data sources are respectively applied as one input (A) to each one of the respective digital comparators 96, 98, and 100. The other, or B-inputs to these digital comparators comprises the respective outputs from the range data memory 24, the azimuth data memory 26, and the elevation data memory 32, which outputs are being circulated back to the inputs. These digital data sources should be understood to also include the interface and buffer circuits shown in FIG. 1.

Digital comparators are commercially available circuits which compare two digital inputs and provide three outputs. One output indicates when the A input equals the B-input ($A = B$), the second output indicates when the A-input is greater than the B-input ($A > B$), and the third output indicates when the B-input is greater than the A-output, ($B > A$). Each one of the B greater than A outputs of these digital comparators are respectively connected as one input to the respective AND gates 100, 102 and 104.

While obviously $A = B$, the outputs can be used for indicating target identicality, it is preferable to establish a "window" or range of values to which the target in memory can be compared or with which it can be correlated. One way for establishing such a window, by subtracting an increment from the target hit data stored in memory and then comparing this value and the value before increment subtraction with the new target hit data, will be exemplified herein. Another way for establishing a window is to make the memory target hit data the center of a window with limits defined by both adding and subtracting increments to the memory target hit data.

The output from the respective memory portions 24, 26, 32, are applied as one input to the respective increment subtractors 106, 108, and 110. The increment to be subtracted from the respective range data, azimuth data and elevation data values is determined in accordance with the size of the window or frame one wishes to establish, which frame defines the size of the region within which it is desired to correlate targets. This frame is established because targets may not be stationary either due to target motion or aircraft motion and thus, the identical target can provide for two reading, different values of range or azimuth or elevation data which nonetheless are produced by the target which is already in memory. It is not desired to repeat the introduction into memory of such a target until it has moved outside of the window which is provided in accordance with this invention.

Thus, a predetermined increment and not necessarily the same in each case, is derived from the increment sources respectively 112, 114, and 116, which is provided for each one of the increment subtractors 106, 108, and 110, respectively. The resulting digital values from the respective increment subtractors 106, 108, and 110 are introduced as B'-inputs into digital comparators 118, 120 and 122, which respectively have, as their A-inputs the outputs from the respective range data source 90, azimuth data source 92 and elevation data source 94. The B'-output of digital comparator 118 is applied to AND gate 100 as its second input. The B'-output of the digital comparator 120 is applied as a second input to AND gate 102 and the B'-output of the digital comparator 122 is applied to the second input to AND gate 104. The outputs of the three AND gates 100, 102 and 104 are three inputs to an AND gate 124 whose output then constitutes an indication of a correlation having been established between the data supplied by the data sources respectively, 90, 92 and 94, and the output of the range data memory portion, azimuth data memory portion, and elevation data memory portion. Upon the establishment of correlation, a 1 bit is placed into a serial shift register 126, which is labeled "correlation indicator." The shift register has the same length as the memory portion shift registers and is shifted in synchronism therewith. Thus, this shift register will bear 1's for every target for which correlation has been established with the target data derived from the range data source, azimuth data source and elevation data source. The contents of this register may be displayed by the display system 82, if desired, along with the associated target hit data.

The correlation indicator register has an input gating arrangement 128 which enables circulation to occur, or a 1 to be written into the register input, or a 0 to be written into the register input. The arrangement shown is a single pole, triple-throw switch wherein the normal or resting position of the switch is one which permits the memory to circulate. When a correlation output is received from the AND gate 124, the switch shifts to the plus 1 contact wherein a 1 is written into the memory. When a new target is to be loaded into the memory, the "load new target command" from the AND gate 70 shown in FIG. 1 is used to enable the switch 128 to connect to a 0 potential which erases the 1 at the input stage of the correlation indicator register 126. This becomes necessary since a new target has not yet been tested for correlation with the new target data which follows it. The establishment of a correlation signal is used to clear the buffer circuits shown in FIG. 1 of the target hit data for which correlation has been established and to call for new target hit data.

The range, azimuth and elevation data received from the respective sources, 90, 92 and 94 is compared with the data for all of the targets in the respective memory portions, 24, 26 and 32. To insure that a comparison with all of the target data in the memory has occured, a cyclic counter 130 is employed. This counter has the same count capacity as there are stages or memory cells in the memory. It is enabled to count through as many counts as there are memory cells in response to the clock pulses which shift the data in the memory. When it achieves a full count, it is known that all of the contents of the memory have been compared with the new data. The full count output of counter 130 sets a flip-flop 131. The Q-output of flip-flop 131 is applied to an AND gate 132.

Correlation may be established before all of the contents of the counter 130 have been compared with the input data. In some cases, it may be necessary to store the fact of the correlation until the total comparison has occured. A flip-flop 134 is employed for this purpose. It is set in response to an output from the AND gate 124. The Q-output of the flip-flop 134 is the second required input to enable AND gate 132. AND gate 132 output is applied to the inverter 72 in FIG. 1. It also clears the output stages of the buffer circuits, respectively 23, 14, 16, so that the next target data can be positioned for loading and correlation testing. Flip-flops 131 and 134 are reset when the cyclic counter 130 attains its No. 1 count. If desired, additional memory bits as well as memory can be provided for storage of elevation bar and PRF data, or to define a special target return such as IFF or ECM, with which correlation has been indicated. The age code provides additional utility. When the same target, which is moving, receives multiple hits which are stored, the decrementing intensity of the target, which is the function of the age code, enables a synthetic target signature trail to be seen on the display, which is easily distinguished from random false alarms and noise. The intensity of the displayed hits are a function of age, thereby defining the target direction. Also, the spacing between the individual target hits is an indication of the relative velocity of the target.

The correlation technique which has been described, avoids the problems which arise where a large number of targets or false alarms are generated which would otherwise rapidly saturate the memory with useless information. This is done by insuring that two targets or false alarms with the same or close to the same position are not stored in the memory at the same time. What happens with the structure described is that the same target or close to the same target is not stored, but the age code is updated. However, if no correlation occurs, the new target is stored in the first available memory location. While the arrangement shown in FIG. 2 describes an increment subtractor, it will be appreciated that if desired, in order to frame a window within which target hits may be correlated with targets already stored in memory, an increment adder may be employed, and the size of the increments in either case may be changed or made different from one another. If it is desired to perform an exact correlation operation without either adding or subtracting increments to the stored target data, a digital comparator such as comparators 96, 98, and 100 may be employed. However, this time the $A = B$ outputs of the three digital comparators are employed as the inputs to the AND gate 124.

Accordingly, there has been described and shown herein a novel, useful and relatively inexpensive arrangement for a scan converter, wherein the size of the memory which is employed is substantially reduced by eliminating redundancy in the data permitted to be stored in the memory.

What is claimed is:

1. In a radar system wherein it is desired to employ a scan converter for the purpose of improving the display of the targets detected by said radar system, and wherein said radar system provides digital data indicative of the coordinates of each target hit, the improvement in said scan converter comprising:

cyclic memory means for storing the digital data coordinates for a plurality of target hits received from said radar system, said cyclic memory means including age code memory means for storing a code for each target hit digital data entered in said memory indicative that it is newly entered, and means for decrementing said age code for each target hit digital data each time it is cycled through said memory, means for comparing the coordinates of each new target hit digital data with the target hit digital data in said memory to determine if correlation exists and to provide a correlation signal indicative thereof, means responsive to said correlation signal to prevent the storage of said new target hit digital coordinates in said memory, and means responsive to the absence of a correlation signal for storing said new target hit digital coordinates in said memory.

2. In a radar system as recited in claim 1 wherein there is included means for sensing the age code of the target hit data as it is transferred from output to input of memory and producing a signal when said age code attains a predetermined value, and means responsive to said age code and the absence of a correlation signal for enabling new target hit data to be stored in said memory in place of the target hit data whose age code has attained said predetermined value.

3. In a radar system wherein it is desired to employ a scan converter for the purpose of improving the display of the targets detected by said radar system, and wherein said radar system provides digital data indicative of the coordinates of each target hit, said coordinates including azimuth, range and elevation, the improvement in said scan converter comprising:

1. cyclic memory means for storing the digital data coordinates for a plurality of target hits received from said radar system, 2. means for comparing the coordinates of each new target hit digital data with the target hit digital data in said memory to determine if correlation exists and to provide a correlation signal indicative thereof, and including:

2a. means for establishing a predetermined range of target hit digital coordinates for target hit digital coordinates in memory which is to be compared with said new target hit digital coordinates, said means for establishing a predetermined range of target hit digital coordinates including:

2a1. means for establishing incremental target hit digital azimuth, range and elevation coordinates, 2a2. means for combining said incremental target hit digital azimuth, range and elevation coordinates with corresponding target hit digital azimuth, range and elevation coordinates derived from said memory to produce incremented target hit digital azimuth, range and elevation coordinates, 2a3. first comparator means to which said new target hit digital azimuth, range and elevation coordinates and said incremented target hit digital azimuth, range and elevation coordinates are applied to produce a first output when said incremented target hit digital azimuth, range and elevation coordinates are all less than said corresponding new target hit digital azimuth, range and elevation coordinates, 2a4. second comparator means to which said new target hit digital azimuth, range and elevation coordinates and said target hit digital azimuth, range and elevation coordinates derived from said memory produce a second output indicative that said target hit digital azimuth, range and elevation coordinates derived from memory are all greater than said new target hit digital data, and 2a5. means responsive to said first and second outputs to produce said correlation signal, and 3. means for comparing said range of target hit digital coordinates with said new target hit digital coordinates and producing said correlation signal whenever said new target hit digital coordinates falls within said range, 4. means responsive to said correlation signal to prevent the storage of said new target hit digital coordinates in said memory, and 5. means responsive to the absence of a correlation signal for storing said new target hit digital coordinates in said memory.

4. In an aircraft radar system wherein it is desired to employ a scan converter for the purpose of improving the display of the targets detected by said radar system and wherein said radar system provides digital position coordinates indicative of each target hit, the improvement in said scan converter comprising:

cyclic memory means including means for storing the digital position coordinates for a plurality of target hits received from said radar system, means for generating an age code for each new target hit to be stored in said cyclic memory means, means for entering an age code into said cyclic memory means together with each new target hit being stored, means to periodically update said age code for each target hit stored in memory, means in said display responsive to said age code for establishing the brightness of the target hit displayed in accordance with its age code, a source of new target hit position coordinates, means for comparing new target hit position coordinates with all of the target hit position coordinates in said cyclic memory means for determining whether or not correlation exists and producing a correlation signal when it is established, means responsive to said correlation signal for storing an indication of correlation in said cyclic memory means for identifying the target hit for which correlation has been established, means for indicating when all of the target hit position coordinates in said cyclic memory means has been compared for correlation and producing a correlation completed signal indicative thereof, and means responsive to a correlation signal and a correlation completed signal for calling for new target hit position coordinates to be compared with the position coordinates in said memory.

5. In an aircraft radar system as recited in claim 4 wherein said soure of new target hit digital position coordinates is said aircraft radar system, there is included a means to detect when the age code for a stored target reaches a predetermined age to produce an age signal indicative thereof, and means responsive to the absence of a correlation signal and the presence of a correlation completed signal and an age signal to store said new target hit data in the place of the target hit data in said cyclic memory the age of which is given by said age signal.

6. In an aircraft radar system as recited in claim 4 wherein said source of new target hit position coordinates is an IFF system.

7. In an aircraft radar system as recited in claim 4 wherein said means for comparing includes means for establishing whether or not correlation exists over a predetermined range of target hit digital position coordinates values.

* * * * *